UNITED STATES PATENT OFFICE.

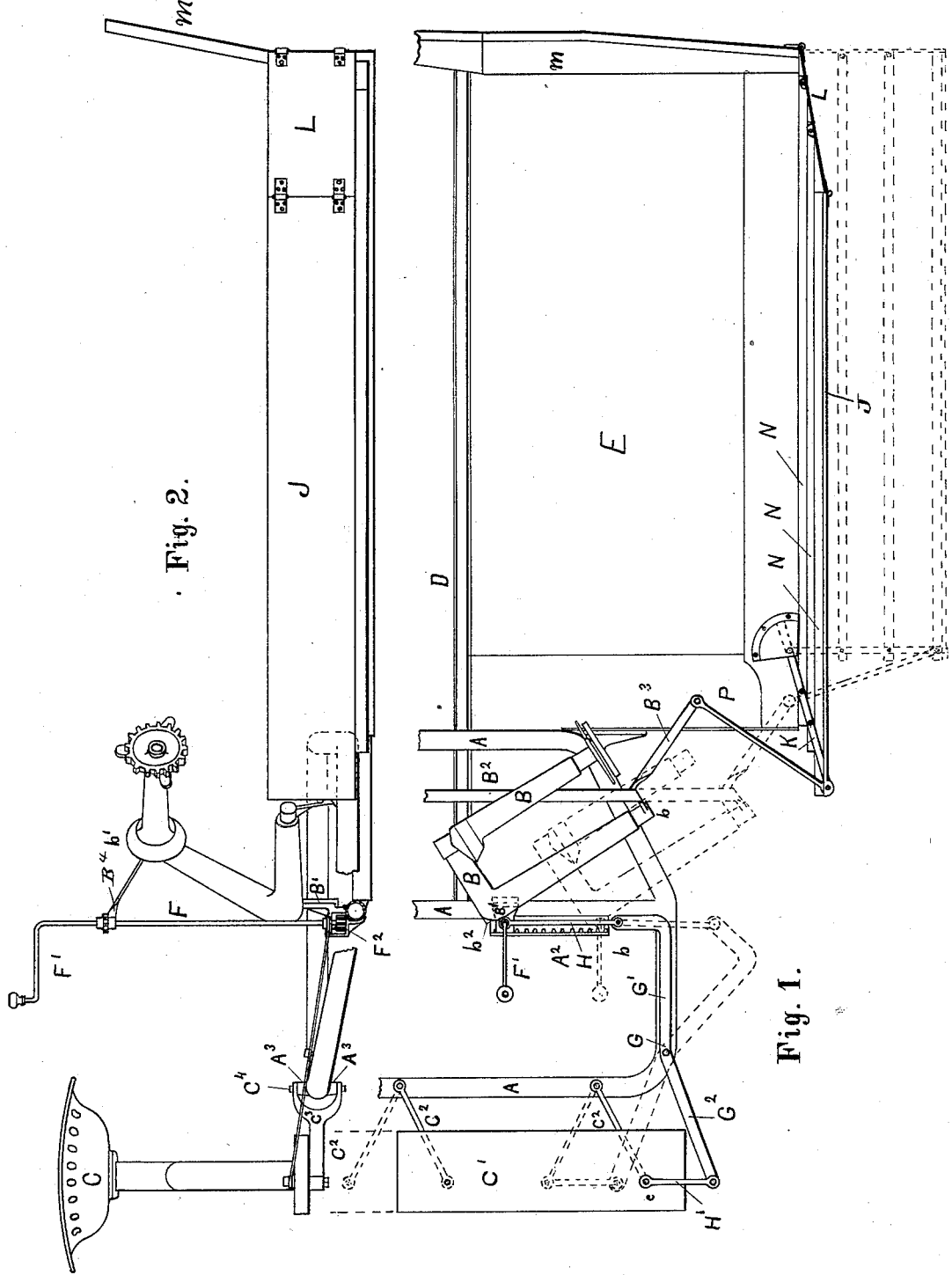

LA VERNE W. NOYES, OF CHICAGO, ILLINOIS, ASSIGNOR TO WILLIAM DEERING, OF SAME PLACE.

GRAIN-HARVESTER.

SPECIFICATION forming part of Letters Patent No. 333,536, dated January 5, 1886.

Application filed October 27, 1884. Serial No. 146,546. (No model.)

*To all whom it may concern:*

Be it known that I, LA VERNE W. NOYES, a citizen of the United States, and residing at Chicago, in the county of Cook and State of Illinois, have invented certain new and useful Improvements in Grain-Harvesters, which are fully set forth in the annexed and following specification.

One purpose of this invention is to provide a self-binding harvester with a binder which may be adjusted forward and backward to and from the cutter-bar, as may be necessary to adapt it to bind long or short grain, and to accomplish this adjustment without disturbing the balance of the machine upon its drive-wheel or other carrying-wheels; and to that end it consists in coupling the driver's seat with the binder-frame so that when the binder is adjusted in one direction the driver's seat may be automatically adjusted in the other direction, so compensating with comparative accuracy for the disturbance in the equilibrium of the machine which the movement of the binder causes.

Another purpose of this invention is to provide an extension of the grain-platform and a head-board, whose position may be made at all times to correspond with the length of the grain being cut, and therefore to the position of the binder, which is adjusted according to the length of the grain; and to that end it consists in providing such adjustable extension of the platform and head-board, and connecting them with the binder-frame so that the adjustment of the latter shall cause an automatic adjustment of the former in the same direction and to the same extent.

Figure 1 is a plan, and Fig. 2 is a rear elevation, of a harvester-frame embodying my improvements.

A is the main frame of the harvester. B is the binder-frame. C is the driver's seat. D is the finger-bar. E is the platform.

The binder-frame is supported upon the main frame by having its outer front corner provided with the lug B', which bears and slides upon suitable ways upon the cross-beam A', and by being provided with the under beam, B², secured to its rear corner, $b$, and resting and sliding upon the main frame underneath it.

In the lug B' is journaled the vertical shaft F, for which another bearing is provided by extending the arm B⁴ from the upper forward corner, $b'$, of the binder-frame. Above the bearing therein provided for the shaft F, the said shaft is furnished with the crank-handle F', which is within reach of the driver on the seat. On the lower end of the shaft is secured the pinion F², and on the cross-beam A' is provided the rack A², with which the pinion F meshes. By rotating the shaft F the binder is moved backward and forward over the main frame.

The driver's seat C is sustained upon the seat frame or plank C', which is sustained and connected with the main frame by two or more equal links, C² C², which are pivoted to the main frame and to the seat-frame, so as to swing in horizontal planes. At the ends which are pivoted to the main frame the links C² C² are forked, the forks C³ C³ embracing the frame-bar of the main frame, which at these points are provided with the vertical lugs A³ A³, through which the bolt C⁴ passing vertically forms the pivot for the links C² C², which, by their length at right angles to the horizontal plane in which the links swing, afford bearings adapted to maintain the seat-frame properly in its horizontal position.

Upon the main frame I pivot the lever G, and connect its arm G' by the link H to the binder-frame at $b²$, and the other arm, G², by the link H' to the rear of the seat-frame C' at $c$, so that as the binder is shifted in either direction the seat-frame is automatically shifted in the opposite direction, so tending to preserve the equilibrium of the machine in all positions of the binder.

It is manifestly immaterial whether the seat-frame be made to actuate the binder-frame or the binder-frame be made to actuate the seat-frame, as illustrated, or the connecting mechanism made to actuate both directly. It is only essential that the movement of one is communicated reversed to the other.

At the rear of the grain-platform is the head-board J, which is connected to the platform by the link K at the stubble end and by the link L at the grain end. The latter (the link L) is hinged to the back board, J, and to the end board or divider, M, and made about as wide as the former.

To the under edge of the link L at the grain end, and to the under side of the link K at the stubble end, I fasten the strips N N N, securing them by bolts, not rigidly, but so as to permit the swinging of the links K and L horizontally, as hereinafter described.

From the rear under part of the binder-frame I extend the arm or lug $B^3$, and to it I link the push rod or link P, pivoting the other end to the rear end of the link K, or to the back board near its pivotal connection with the link K. The action of this structure is that as the binder is shifted backward or forward the link or push-rod P pushes or pulls the back board, J, in the same direction, and the back board guided by the links K and L swings from the position shown in the dotted lines to that shown in the full lines, or vice versa, and the slats N N N preserve their direction parallel to the platform in all positions, and in all positions serve to support the heads of the grain. When the back board, J, is farthest forward, the link L becomes a part of said back board; and when the back board is farthest back, the link L becomes a continuation of the divider, and in intermediate position it extends obliquely from one to the other, and in all positions performs the function of retaining the grain properly on the platform.

I claim—

1. In a self-binding grain-harvester, the combination, with the main frame, and with the binder-frame movable backward and forward thereon, and with the grain-platform rigid with the main frame, of the back board, J, movable to and from the cutter-bar, substantially as and for the purpose set forth.

2. In a self-binding grain-harvester, the combination, substantially as hereinbefore set forth, of the main frame, the binder-frame movable backward and forward thereon, the grain-platform, the adjustable back board, and the adjustable platform extension composed of the slats N N N, and the links K and L.

3. In a self-binding grain-harvester, in combination with the main frame, the binder-frame movable backward and forward thereon, the grain-platform, the back board, and the links, which connect it to the platform, the slats sustained by said links, and the push and pull rod connected to the binder-frame and actuating the back board, substantially as and for the purpose set forth.

4. In combination, substantially as hereinbefore set forth, the grain-platform, the adjustable back board, the link K, the divider, and the link L, substantially equal in width to the back board, and hinged thereto and to the divider.

In testimony whereof I have hereunto set my hand, in the presence of two witnesses, at Chicago, Illinois, this 16th day of August, A. D, 1884.

LA VERNE W. NOYES.

Attest:
I. K. WEST.
CHAS. S. BURTON.